Feb. 20, 1968     B. GLASSMAN     3,369,743
AUTOMATED DISCOUNT DEVICE
Filed Jan. 24, 1967     2 Sheets-Sheet 1

Feb. 20, 1968  B. GLASSMAN  3,369,743
AUTOMATED DISCOUNT DEVICE
Filed Jan. 24, 1967  2 Sheets-Sheet 2

United States Patent Office 3,369,743
Patented Feb. 20, 1968

3,369,743
AUTOMATED DISCOUNT DEVICE
Barnett Glassman, 245 W. 55th St.,
New York, N.Y. 10019
Filed Jan. 24, 1967, Ser. No. 611,288
6 Claims. (Cl. 235—58)

ABSTRACT OF THE DISCLOSURE

This invention is a device for automatically discounting a preselected value by a predetermined amount and it also prints both the original and the discounted amount. The invention comprises a first operative gear train connected to a first set of counting gears to indicate the given number, a second operative gear train mounted on a yoke and adapted to discount the given number by use of a lesser predetermined number of teeth engaging a second set of counting gears to indicate the discounted number, and a shaft connected at one end directly to said first operative gear train and connected at its other end to receive said yoke and its discounting wheel.

Because of the vast amount of discounting done in the business world there is a need for a machine that will indicate and record the given figure and automatically and simultaneously indicate and record the discounted figure.

It is an object of this invention to provide a machine which when fed a given number automatically calculates a discounted value by a predetermined percent of discount.

It is another object to provide a device which is adapted to record both the given number and the discounted number upon a negotiable check which is one sheet of a group of superimprosed sheets used in a specific credit plan. This credit plan requires use of a key or facsimile thereof to be imprinted on the superimposed sheets for signature verification.

Figure 1:
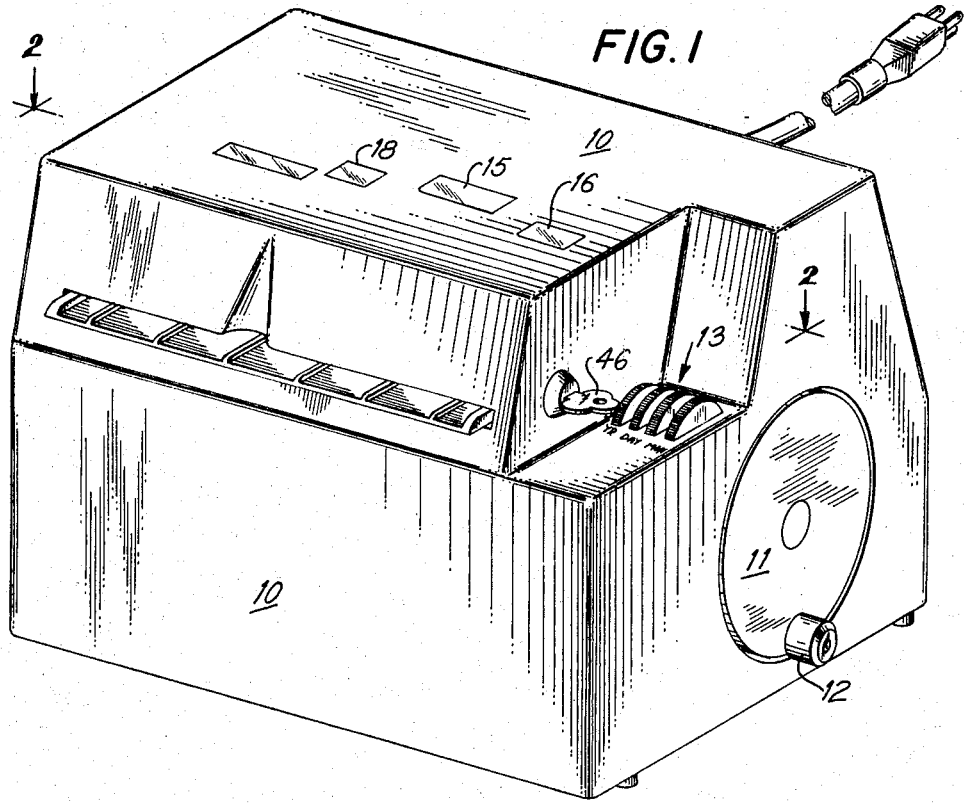
Figure 2:
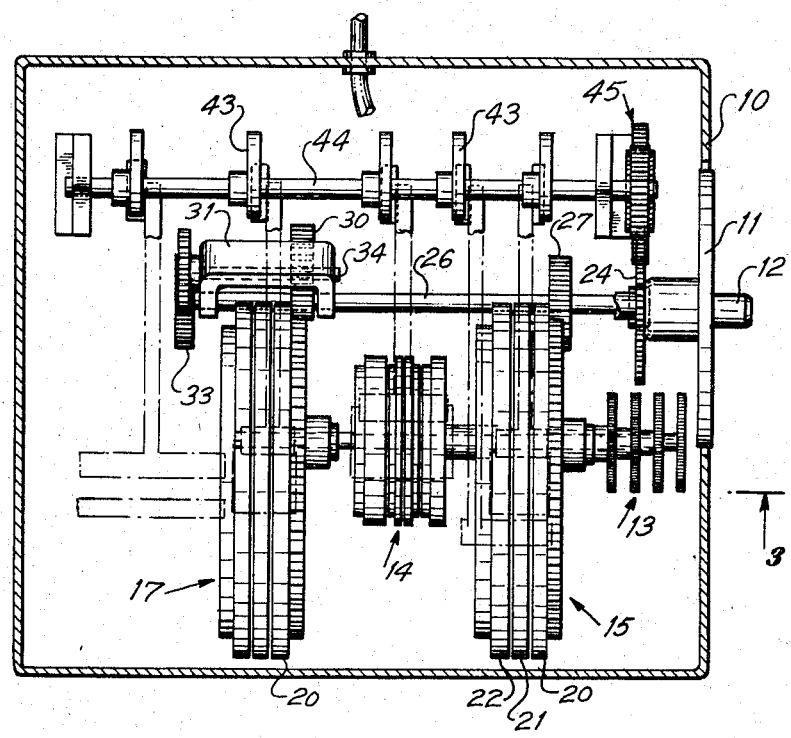
Figure 3:
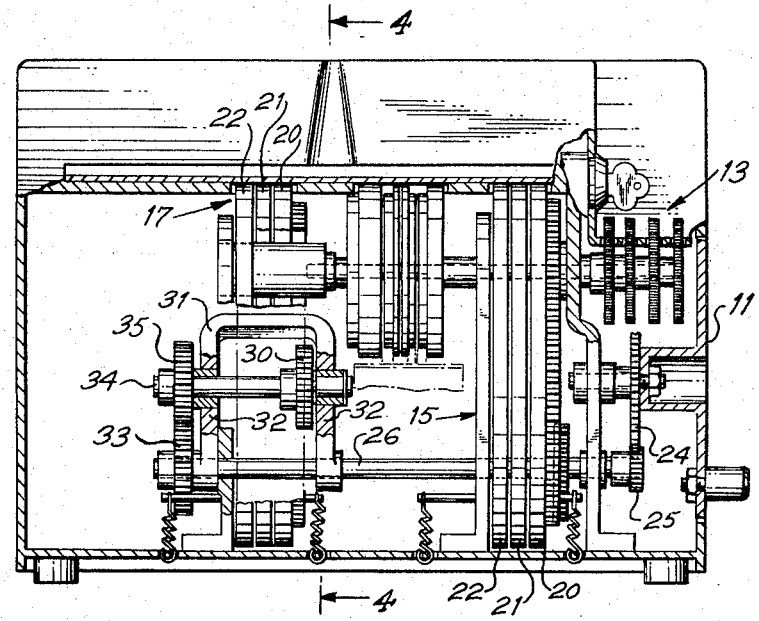
Figure 4:
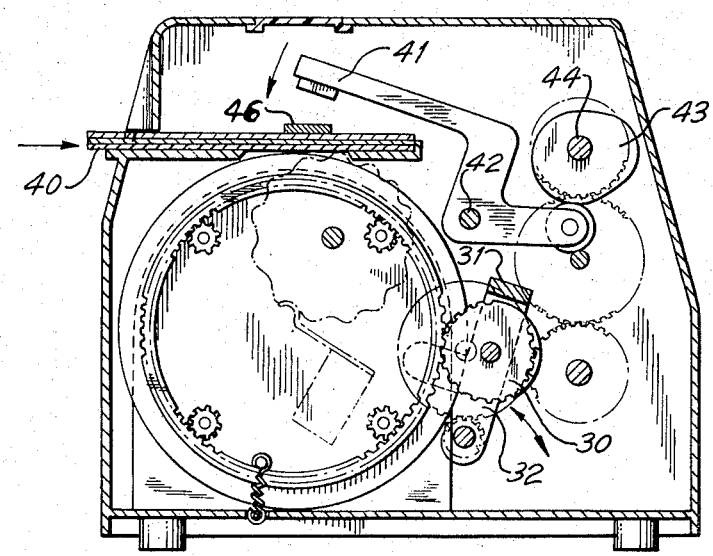

These and other objects of this invention will become apparent upon reading the following descriptive disclosure of an illustrative embodiment relating to bank checks and the like, which embodiment is shown in the accompanying drawing in which;

FIG. 1 is an isometric view of an electrical check writing device showing a hand crank wheel for simultaneously cranking the given number and the discounted number, and showing further conventional thumb wheels for setting the date, a slot for inserting the check or a manifold of papers including the check and sight glasses on the top wall of the cabinet for reading the given number and the discounted number, FIG. 2 is a schematic view taken generally on line 2—2 of FIG. 1 and showing in outline the first set of conventional counting gears to indicate the given number and a like second set of conventional counting gears to indicate the discounted number and showing the common shaft from the hand crank wheel for engaging the first and the second set of counting gears through respective gear means connected thereto, FIG. 3 is a schematic section view taken on line 3—3 of FIG. 2 and showing the yoke gear means connected to the outer end of the shaft and engaging the set of discounting counting gears and showing also a gear secured directly to the inner end of said shaft and engaging the set of counting gears used to indicate the given number, and FIG. 4 is a view taken on line 4—4 of FIG. 3 and showing the manner of locating the check in the cabinet and the manner of obtaining a hammer blow to print the numbers from carbon paper.

This invention is an improvement in that it provides an automatic discounting apparatus to prior art conventional counting gears.

Since the overall apparatus of this invention includes considerable conventional structure, such prior art structure in the following description will be alluded to without detailing its structure.

Turning to the drawing, a cabinet 10 of sheet metal is provided with an opening for a hand crank wheel 11 having a handle 12. A set of conventional thumb operated date wheels 13, actuate date reading wheels 14 so that the set date appears in a sight glass 15 in the cabinet 10.

The device of this invention is provided with a pair of identical sets of counting wheels, one set 15 to present the given number, given by the operator and appearing in sight glass 16 and the other set 17 to present the discounted number and appearing in sight glass 18.

The counting sets 15 and 17 are of substantially identical structure and comprise a cents wheel having peripheral raised numerals from 01 to 99, a first dollar wheel having peripheral raised numerals from 01 to 99 and a hundreds dollar wheel having peripheral raised numerals from 001 to 999.

The gear structure of the conventional counting wheels of each set is so made that first dollar wheel is advanced one dollar everytime the cents wheel passes beyond 99 in the sight glass 16.

Thus the cents wheel 20 actuates the first dollar wheel 21 on each revolution and the first dollar wheel 21 after reading 99 dollars actuates the hundreds of dollars wheel 23, each time it completes a revolution.

The essence of the discounting mechanism of this invention is shown in FIGS. 2 to 4. As shown in FIG. 3, the wheel 11 is connected by gear 24 to gear 25 on shaft 26.

A gear 27 is locked to shaft 26 as by a key in the shaft and engages the offset portion of conventional counting gear 20 (FIG. 2) driving it through its cycle of 01 to 99 cents. Counting gear 20 actuates its adjacent dollar gear 21 everytime it completes a revolution and the 99 cent raised numeral passes beyond the sight glass 16.

In order to bring about a discounting effect on the second set of gears 17, according to this invention there is provided a discount gear 30 so proportioned as to predetermined teeth number and size as to actuate the gear 20 of the set of counting gears 17 in a slower manner. Thus each discount gear is made to specifications for each amount of discount. Thus there may be provided a 5 percent discount gear 30 and also a 10 percent discount gear 30.

Because of the varying diameters and number of teeth in each discount gear 30, the gear can not be mounted directly to shaft 26. Accordingly, there is provided a yoke 31 in which the gear 30 is mounted.

As shown in FIG. 3, the yoke 31 is of U-shape construction each of its arms 32 being provided at their respective ends with bearing apertures to receive shaft 26. Thus the yoke 31 may be swingably moved on shaft 26 for interchanging of discount gear 30 as desired.

In order to actuate gear 30, the end of shaft 26 is provided with an end gear 33. As shown in FIG. 3, the arms 32 are each provided with apertures near the base of the yoke 31 and a protruding shaft 34 is disposed through bearings located in these apertures.

A gear 35 is secured to the protruding end of shaft 34 and engages gear 33 of shaft 26. The discount gear 30 is secured by a set screw or a key to shaft 34. Clearly removal of shaft 34 from the yoke arm 32 permits a new discount gear 30 to be placed thereon.

It is important that the pitch of the gear 30 be the same as that of the gear on counting wheel 20. This is done by suitable removal of teeth with change of gear 30 diameter so that when the yoke 31 places the new gear 30 against the counting wheel 20 of the counting set 17, there is a perfect meshing of the gears.

In order to print the embossed signature, date, given number, discounted number and like indicia on the superimposed form 40 a plurality of cam actuated hammers 41 are disposed over the raised indicia. The hammers 41 are mounted on shaft 42 and engage cams 43 mounted on shaft 44.

The hammers 41 may be actuated by electrical actuation of shaft 44 or by actuation from a suitable train of gears 45 secured suitably to gear 24 of the hand crank.

As an illustrative embodiment of this invention, a credit plan using a signature key for check identification is shown herein to prepare a negotiable check for a discounted amount.

This check has as indicia thereon, the given number as a reference amount but the check is made out to the discounted amount. The key of this credit plan has the payor's signature embossed thereon and said embossed signature is imprinted upon the check in close proximity to the payor's signature.

Referring to the drawing and FIG. 1 thereof, the signature key 46 is inserted into the device and preferably the inserted motion of the key engages an electrical switch causing the device to operate and thus to actuate the hammers 41 to produce an imprint of the embossed signature of the key, the given amount, the discounted amount and the date upon the superimposed sheets, including the check form, having carbon transfer means therebetween.

After actuation of the device the imprinted multiform element 40 is removed and the check is signed by the payor.

In lieu of a key 46, a plastic credit card containing the payor's embossed signature may be used, in which event the card is inserted in the slot for the multiform element 40 so as to be disposed below the appropriate signature hammer 41.

Thus while the device of this invention is preferably employed in a key using credit plan, the discounting mechanism therein is useable in many other operations. Accordingly this invention is not limited to its illustrative embodiment herein.

I claim:

1. A computing device for automatically discounting a given number, comprising a first set of conventional interconnected counting wheel means to register the given number; a second set of conventional interconnected counting wheel means, to register the discounted number, substantially identical to said first set; shaft means connecting said first set of counting wheel means to said second set of counting wheel means; a gear disposed fixedly on said shaft means and engaging said first set of counting wheel means to indicate the given number; yoke gear means having a discounting gear engaging said second set of counting wheel means, and said shaft means; and operative means actuating said shaft means to present said given number on said first set of counting wheel means and simultaneously presenting the discounted number on the second set of counting wheel means.

2. The device of claim 1 wherein said yoke gear means comprises a U-shaped yoke the ends of the arms of which are adapted to and receive said shaft means whereby said yoke gear means are swingably mounted on said shaft means.

3. The device of claim 2 wherein each of said arms of said U-shaped yoke has an aperture located near the base of the yoke, an axle disposed in said apertures, gear means connecting said axle to said shaft means and a discount gear removably mounted on said axle and adapted to engage said second set of counting wheel means.

4. The device of claim 3 wherein said discount gear is of predetermined number of teeth and wheel diameter to effectuate a preselected amount of discount and adapted to mate with said second set of counting wheel means.

5. The device of claim 4 comprising an enveloping cabinet having a longitudinal slot to receive a multi-form element having a check form therein, said device comprising a plurality of hammer means adapted to transfer indicia to said multi-form element.

6. The device of claim 5 comprising key receiving means adapted to receive an element having an embossed signature thereon, said key receiving means being in predetermined space relationship to said check form.

References Cited

UNITED STATES PATENTS

| | | | |
|---|---|---|---|
| 2,024,115 | 12/1935 | Schwartz | 235—94.1 |
| 3,014,657 | 12/1961 | Sargent et al. | 235—94 |
| 3,121,531 | 2/1964 | Bumpus et al. | 235—61 |
| 3,274,690 | 9/1966 | Beverly | 235—61 |
| 3,317,129 | 5/1967 | Berck et al. | 235—61 |

RICHARD B. WILKINSON, *Primary Examiner.*

S. A. WAL, *Assistant Examiner.*